United States Patent
Masumoto et al.

(10) Patent No.: US 11,595,120 B2
(45) Date of Patent: Feb. 28, 2023

(54) OPTICAL TRANSMISSION SYSTEM AND UNUSED CHANNEL VERIFICATION METHOD

(71) Applicant: Nippon Telegraph and Telephone Corporation, Tokyo (JP)

(72) Inventors: Kana Masumoto, Tokyo (JP); Toshiya Matsuda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 85 days.

(21) Appl. No.: 17/293,320

(22) PCT Filed: Oct. 30, 2019

(86) PCT No.: PCT/JP2019/042648
§ 371 (c)(1),
(2) Date: May 12, 2021

(87) PCT Pub. No.: WO2020/100600
PCT Pub. Date: May 22, 2020

(65) Prior Publication Data
US 2021/0409113 A1    Dec. 30, 2021

(30) Foreign Application Priority Data
Nov. 13, 2018  (JP) .............................. JP2018-212703

(51) Int. Cl.
*H04B 10/032*    (2013.01)
*H04B 10/516*    (2013.01)

(52) U.S. Cl.
CPC ......... *H04B 10/032* (2013.01); *H04B 10/516* (2013.01)

(58) Field of Classification Search
CPC ............................ H04B 10/032; H04B 10/516
See application file for complete search history.

(56) References Cited

U.S. PATENT DOCUMENTS 5,130,836 A * 7/1992 Kaharu ............... H04B 10/278
                                                    398/154
5,760,940 A * 6/1998 Frigo ................. H04B 10/035
                                                    398/38

(Continued)

OTHER PUBLICATIONS

[No Author Listed], "Optical Fiber Classifier," Furukawa Electric Co., Ltd., 2018, 5 pages (with English Translation).

*Primary Examiner* — Tanya T Motsinger
(74) *Attorney, Agent, or Firm* — Fish & Richardson P.C.

(57) ABSTRACT

A function of detecting an unused path through which actual data is not transmitted in a long-distance redundant network is realized at low cost. In an optical transmission system 20, each of the optical transceivers 21a and 21b that are connected to each other by an optical fiber cable 22 and disposed separately includes a protocol IC unit 35. The protocol IC unit 35 transmits an idle signal A1 with empty data using an optical signal P1 to an unused path of the optical fiber cable 22. At the time of this transmission, the protocol IC unit 35 outputs, to the transmission unit 33, a control signal C1 for performing, at a fixed modulation period, ON/OFF modulation on the optical signal P1 on which the idle signal A1 is superimposed. Also, the protocol IC unit 35 transmits an OAM signal O1 at an OAM period that is a period different from a modulation period, and performs control to turn ON the control signal C1 at the time of this transmission. The protocol IC unit 35 performs control to set the QAM period T2 as a period longer than or equal to a plurality of modulation periods T1. The transmission unit 33 is configured to perform ON/OFF modulation on the optical signal P1 using the control signal C1, and transmits the modulated optical signal P1.

10 Claims, 9 Drawing Sheets

(56) References Cited

U.S. PATENT DOCUMENTS

| | | | | |
|---|---|---|---|---|
| 6,483,616 B1* | 11/2002 | Maddocks | H04B 10/0771 | 398/1 |
| 6,563,613 B1* | 5/2003 | Tochio | H04J 14/0282 | 398/25 |
| 7,079,555 B2* | 7/2006 | Baydar | H04Q 11/0407 | 370/540 |
| 2002/0109875 A1* | 8/2002 | Eijk | H04Q 11/0066 | 398/58 |
| 2002/0109876 A1* | 8/2002 | Eijk | H04Q 11/0066 | 398/58 |
| 2004/0017965 A1* | 1/2004 | Abe | H04B 10/035 | 385/24 |
| 2006/0093356 A1* | 5/2006 | Vereen | H04L 63/1408 | 398/33 |
| 2009/0154919 A1* | 6/2009 | Desbruslais | H04B 10/0771 | 398/136 |
| 2009/0230255 A1* | 9/2009 | Lemonovich | G06F 15/17 | 712/30 |
| 2010/0002591 A1* | 1/2010 | Mizutani | H04L 43/0852 | 370/468 |
| 2011/0102776 A1* | 5/2011 | Hasegawa | G01M 11/3136 | 356/124.5 |
| 2011/0128861 A1* | 6/2011 | Ding | H04L 43/062 | 370/248 |
| 2011/0305458 A1* | 12/2011 | Zhou | H04J 3/1694 | 398/66 |
| 2013/0045010 A1* | 2/2013 | Mukai | H04J 3/0688 | 398/52 |
| 2013/0209093 A1* | 8/2013 | Tanimura | H04B 10/0775 | 398/32 |
| 2015/0003230 A1* | 1/2015 | Mitsumori | H04L 45/22 | 370/218 |
| 2017/0359127 A1* | 12/2017 | Moeller | H04B 10/58 | |
| 2021/0409113 A1* | 12/2021 | Masumoto | H04B 10/516 | |

* cited by examiner

OPTICAL TRANSMISSION SYSTEM AND UNUSED CHANNEL VERIFICATION METHOD

CROSS-REFERENCE TO RELATED APPLICATIONS

This application is a National Stage application under 35 U.S.C. § 371 of International Application No. PCT/JP2019/042648, having an International Filing Date of Oct. 30, 2019, which claims priority to Japanese Application Serial No. 2018-212703, filed on Nov. 13, 2018. The disclosure of the prior application is considered part of the disclosure of this application, and is incorporated in its entirety into this application.

TECHNICAL FIELD

The present invention relates to an optical transmission system and a method for checking an unused path for appropriately checking an unused path in a redundant network that includes a plurality of path to reach a destination node.

BACKGROUND ART

Conventionally, in a redundant network of an optical transmission system, long-distance communication is performed to which a common optical communication method is applied, and an OAM (Operation Administration and Maintenance: maintenance and monitoring function) signal that is superimposed on an optical signal is transmitted at a fixed period, regardless of whether or not actual data superimposed on the optical signal is transmitted. The optical signal is responsible for transmission of various data, such as actual data and the OAM signal.

This redundant network will be described with reference to a redundant network 10A with a configuration shown in FIG. 10. In the redundant network 10A, a transmission source node 11 that transmits data and a destination node 12 that is a destination of this data are connected to each other via a first path 14 and a second path 15 via routers 13a and 13b that are disposed on the respective node 11 and 12 sides, respectively. The first and second paths 14 and 15 are constituted by optical fiber cables (also referred to as optical fibers). The transmission source node 11 is connected to the router 13a, and the router 13b is connected to the destination node 12, by the optical fibers. The transmission source node 11 and the destination node 12 are optical transceivers that transmit and receive optical signals.

An actual data signal D1, which has been transmitted while being superimposed on an optical signal from the transmission source node 11, is transmitted through the first path 14 between the nodes 11 and 12, and this path (first path 14) through which the actual data signal D1 is transmitted will be referred to as a used path. The path (second path 15) through which the actual data signal D1 is not transmitted will be referred to as an unused path. The OAM signal is transmitted at a fixed period through both the used path and the unused path.

In this communication state, if a node 16, such as a transponder or a router, needs to be added to the first path 14 that is currently in use, as shown by a broken-line frame in FIG. 11, the used path is switched to the second path 15 (FIG. 10), which is currently the unused path, to transmit the actual data signal D1. Thereafter, the first path 14, which has been the used path, is switched to the unused path. The OAM signal is transmitted to both the switched used path and unused path in the same manner as above.

Next, an operation to add the node 16 to the first path 14, which has been switched to the unused path, is performed. At this time, since the first path 14 is in a conductive state, a connector of the first path 14 needs to be pulled out from the router 13b. However, a large number of optical fibers serving as paths are connected to the router 13b via the connector.

Then, if an operator pulls out a connector of the second path 15 that is currently the used path by mistake, as indicated by a "x" sign in FIG. 12, the second path 15 is switched to a non-conductive, stopped state. To prevent such a mistake, measures are taken; e.g. optical fiber cables are tagged or identified by the cable color, but still human error occurs.

There is a technique for appropriately detecting an unused path without error, using an optical fiber identifier described in NPL 1. This is called an optical fiber identification technique, and identification light that has a different wavelength from the aforementioned optical signal and has been subjected to low-speed modulation (which will be described later) is transmitted from a light transmitter to an optical fiber that is the unused path for which the operation is performed. An optical fiber cable through which this optical signal is transmitted is held from two sides by the optical fiber identifier to bend the optical fiber cable, and the identification light is detected by detecting leakage light generated due to the bending, using the optical fiber identifier. The unused path can be detected by detecting this identification light.

Note that the identification light is transmitted by providing an optical transmitter with the following function. That is to say, the optical transmitter has a function of oscillating the identification light when detecting a state where actual data is not being transmitted with the actual data superimposed on the optical signal, i.e, an idle state that is a null-data state.

Since the aforementioned leakage light has low power (e.g. −80 dBm at the minimum), it needs to be distinguished from noise, and thus, it is common to impart low-speed modulation to the identification light by means of low-speed on-off modulation. The optical fiber identifier is constituted by an optical fiber cable bending unit and an identification light detection unit. The amount by which an optical fiber cable is bent by the bending unit is designed in a range that does not give the optical signal adverse influence, such as signal loss. To increase the amount of leakage light generated due to the bending, the identification light has a wavelength on a long wavelength side relative to the optical signal.

CITATION LIST

Patent Literature

[NPL 1] Furukawa Electric Co., Ltd. "Optical Fiber Identifier", [online], 2018, [Searched on Oct. 27, 2018], Internet <URL: https://www.furukawa.co.jp/common/images/l_footer/logo_group.svg>

SUMMARY OF THE INVENTION

Technical Problem

However, there is the following problem in the optical fiber identification technique that uses the optical fiber identifier described in NPL 1 above. The optical signal is usually transmitted with a wavelength near the wavelength with the least light loss. In addition, since identification light is introduced that is an optical signal with a wavelength on the long wavelength side relative to the optical signal, identification light in the L-band (1565 nm to 1625 nm) is used with respect to the optical signal that is in the C-band (1530 nm to 1565 nm).

To transmit optical signals with these two different wavelengths, a relay amplifier cannot be used for the optical fibers. If the relay amplifier cannot be used, only short-distance communication can be performed, and thus, the above optical fiber identification technique cannot be used in a long-distance optical transmission system. Moreover, two optical transmitters for the optical signal and the identification light are needed, resulting higher cost.

The present invention has been made in view of the foregoing situation, and an object of the present invention is to provide an optical transmission system and a method for checking an unused path that can realize, at low cost, a function of detecting an unused path through which actual data is not transmitted in a long-distance redundant network.

Means for Solving the Problem

As a means for solving the above-described problem, the invention according to claim 1 is an optical transmission system in which an unused path through which actual data is not transmitted from communication terminal devices connected to optical transceivers, each of which has a transmission unit for transmitting an optical signal and a receiving unit for receiving the optical signal, can be detected from a plurality of optical transmission paths through which a pulsed OAM signal for maintenance and monitoring is transmitted while being superimposed on the optical signal, the optical transmission paths connecting the optical transceivers, each of the optical transceivers including: a control modulation unit for outputting, to the transmission unit for transmitting the optical signal, a control signal for modulating, at a fixed modulation period, the optical signal on which an idle signal with empty data is superimposed, the idle signal being transmitted through the unused path while being superimposed on the optical signal, and performing control to turn ON the control signal when the OAM signal with an OAM period, which is a period different from the modulation period, is output, wherein the control modulation unit performs control to set the QAM period as a period longer than or equal to a plurality of modulation periods, and the transmission unit modulates the optical signal using the control signal.

According to this configuration, if the OAM period is set to a period that exceeds, for example, two modulation periods by the control modulation unit, the optical signal corresponding to one modulation period that has been modulated based on the control signal when the idle signal is transmitted can be reliably caused to be present within one period of the OAM signal that rises in a pulsed manner, for example, at the OAM period. The modulated portion of the optical signal corresponding to one modulation period is detected by a detector from outside the optical transmission path, and the idle signal can be appropriately detected. Thus, the unused path can be appropriately detected.

The control modulation unit that enables this detection can be configured only by configuring a control modulation unit that performs the above control using an FPGA (Field Programmable Gate Array), in the case of using an optical transceiver equipped with the FPGA is mounted that allows a connection configuration of a logic circuit to be changed and can be freely programmed. This can be realized at low cost since no additional circuit, additional device, or the like is required. Furthermore, optical signals with two different wavelengths need not be transmitted to detect the unused path as in the conventional technique, and only an optical signal with one wavelength is needed in the present invention. For this reason, a relay amplifier can be used, and the unused path can be detected even in a long-distance optical transmission path. Accordingly, a function of detecting the unused path through which the actual data is not transmitted in a long-distance redundant optical transmission path (redundant network) can be realized at low cost.

The invention according to claim 2 is the optical transmission system according to claim 1 in which the control modulation unit performs control to set the OAM period as a period that exceeds two modulation periods.

According to this configuration, the optical signal corresponding to one modulation period that has been modulated based on the control signal when the idle signal is transmitted can be reliably caused to be present within the OAM period. Thus, the idle signal can be appropriately detected, and therefore the unused path can be appropriately detected.

The invention according to claim 3 is the optical transmission system according to claim 1 in which the control modulation unit performs control to set the OAM period as a period equal to two modulation periods, and to separate a timing of the OAM signal with the OAM period from a timing of an ON section of the control signal.

According to this configuration, even if the OAM period is a short period equal to two modulation periods, an optical signal corresponding to one modulation period that has been modulated based on the control signal when the idle signal is transmitted can be reliably caused to be present within the OAM period. Thus, the idle signal can be appropriately detected, and therefore the unused path can be appropriately detected.

The invention according to claim 4 is the optical transmission system according to any one of claims 1 to 3 in which the control modulation unit has a circuit configuration with an FPGA (Field Programmable Gate Array) that is installed in advance in each of the optical transceivers, allows a connection configuration of a logic circuit to be changed, and can be programmed.

According to this configuration, the control performed by the control modulation unit can be carried out by changing the connection configuration of the logic circuit of the FPGA, and no additional circuit, or additional device, or the like is required to carry out this control. Thus, the control modulation unit can be realized at low cost.

The invention according to claim 5 is the optical transmission system according to any one of claims 1 to 4 that further includes a detector for detecting the idle signal when detecting, a predetermined number of times, a modulated portion of a fixed modulation period of the optical signal based on the control signal output when the idle signal is transmitted, and detecting, based on the detection of the idle signal, that an optical transmission path is the unused path.

According to this configuration, the idle signal can be appropriately detected, and it is therefore possible to appropriately detect the unused path.

The invention according to claim 6 is a method for checking an unused path in an optical transmission system in which an unused path through which actual data is not transmitted from communication terminal devices connected to optical transceivers, each of which has a transmission unit for transmitting an optical signal and a receiving unit for receiving the optical signal, can be detected from a plurality of optical transmission paths through which a pulsed QAM signal for maintenance and monitoring is transmitted while being superimposed on the optical signal, the optical transmission paths connecting the optical transceivers, each of the optical transceivers executing: outputting, to the transmission unit for transmitting the optical signal, a control signal for modulating, at a fixed modulation period, the optical signal on which an idle signal with empty data is superimposed, the idle signal being transmitted through the unused path while being superimposed on the optical signal; performing control to turn ON the control signal when the OAM signal with an OAM period, which is a period different from the modulation period, is output; and performing control to set the CAM period as a period longer than or equal to a plurality of modulation periods, and the transmission unit executing: modulating the optical signal using the control signal.

According to this method, the function of detecting the unused path of a long-distance redundant optical transmission path can be realized at low cost, substantially similarly to the effects of the optical transmission system of claim 1.

Effects of the Invention

According to the present invention, an optical transmission system and a method for checking an unused path can be provided that can realize, at low cost, a function of detecting an unused path through which actual data is not transmitted in a long-distance redundant network.

DESCRIPTION OF EMBODIMENTS

Figure 1:
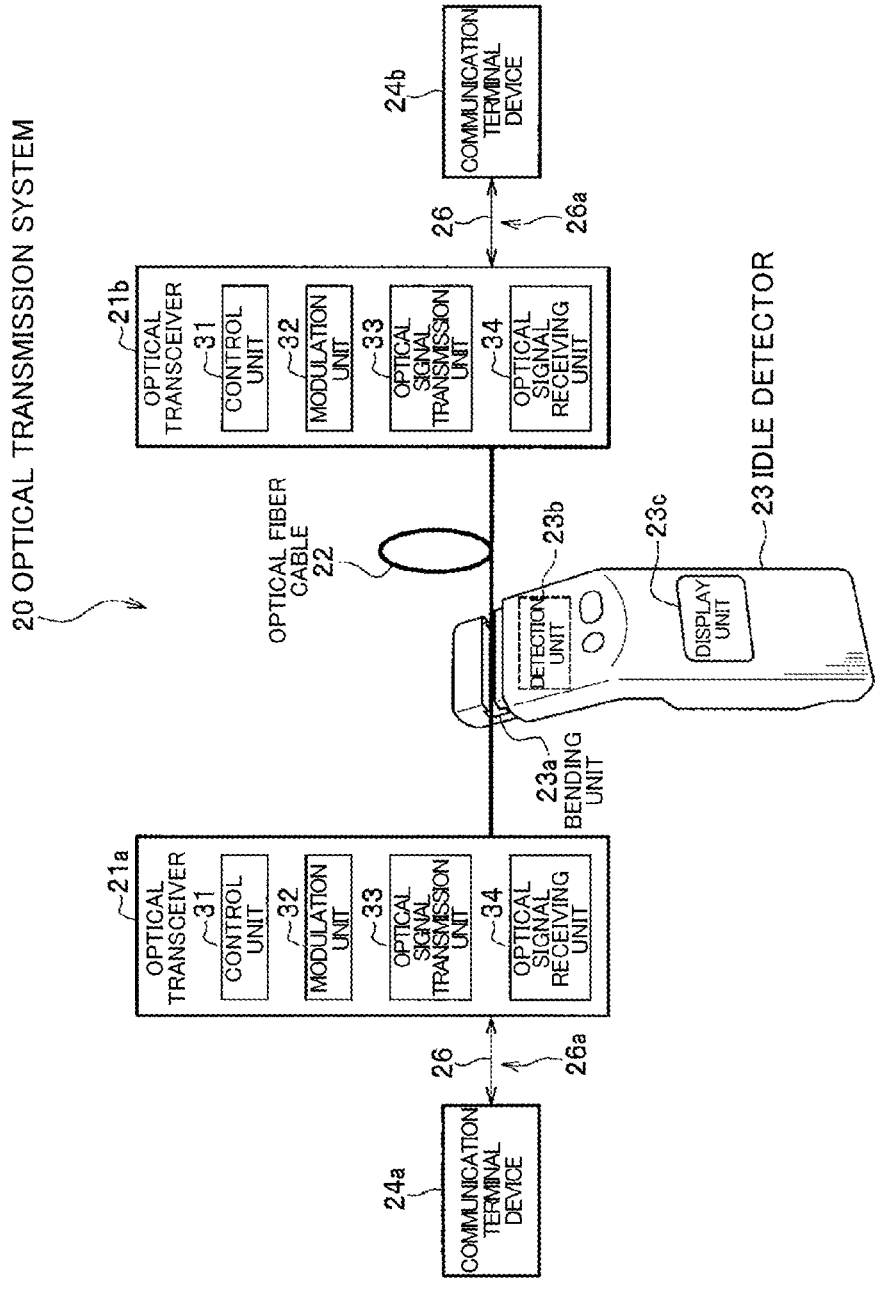
FIG. 1 is a block diagram showing a configuration of an optical transmission system according to an embodiment of the present invention.

Hereinafter, an embodiment of the present invention will be described with reference to the drawings. However, constituent portions with corresponding functions are assigned the same reference numerals in all diagrams of the present specification, and descriptions thereof are omitted as appropriate.

Configuration of Embodiment

FIG. 1 is a block diagram showing a configuration of an optical transmission system according to an embodiment of the present invention.

Figure 2:
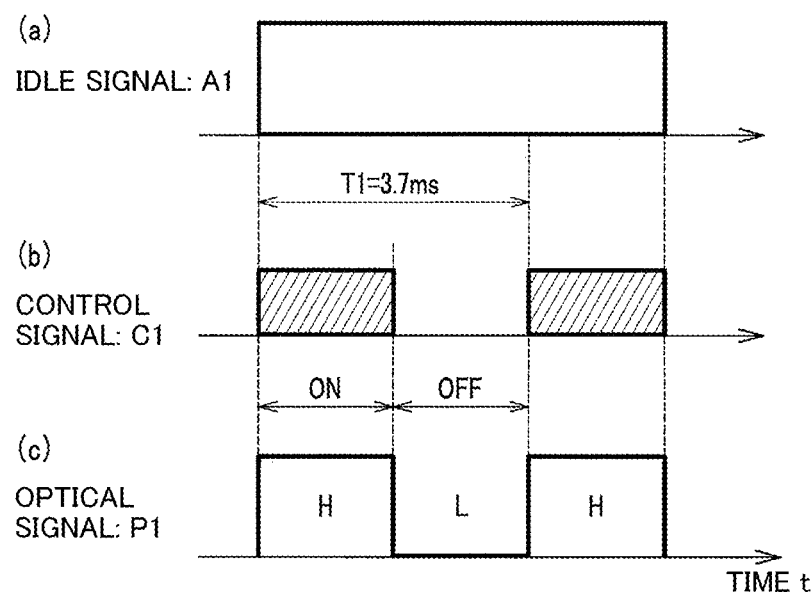
FIG. 2 is a timing chart showing timings of (a) an idle signal, (b) a control signal, and (c) an optical signal in the optical transmission system of the present embodiment.

An optical transmission system 20 shown in FIG. 1 includes optical transceivers 21a and 21b that are separately disposed on respective sides at remote locations, an optical fiber cable 22 (also referred to as an optical fiber 22) that connects these optical transceivers 21a and 21b, an idle detector (detector) 23 that detects an idle signal A1 (see FIG. 2(a)) transmitted through the optical fiber 22, and communication terminal devices 24a and 24b such as personal computers that are connected to the respective optical transceivers 21a and 21b provided on the respective sides.

Figure 10:
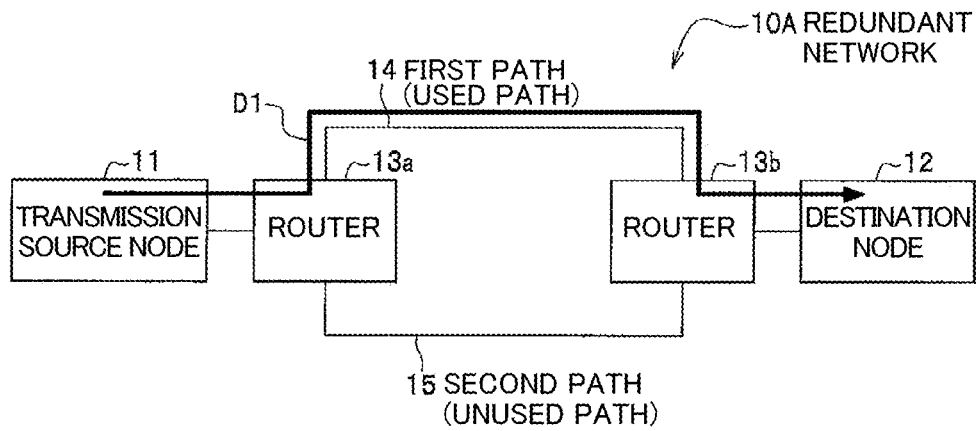
FIG. 10 is a diagram showing a configuration in the case where a first path in a redundant network in a conventional optical transmission system is a used path, and a second path is an unused path.
Figure 11:
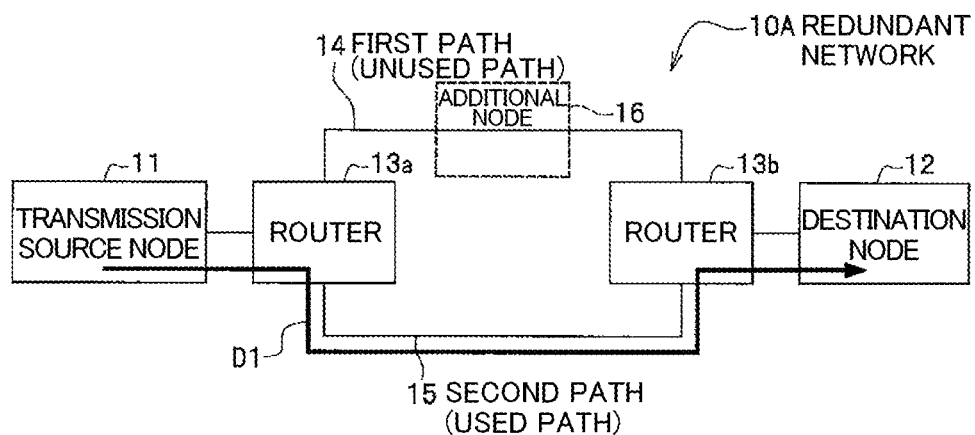
FIG. 11 is a diagram showing the configuration in the case where the first path in a redundant network in the conventional optical transmission system is an unused path, and the second path is a used path.
Figure 12:
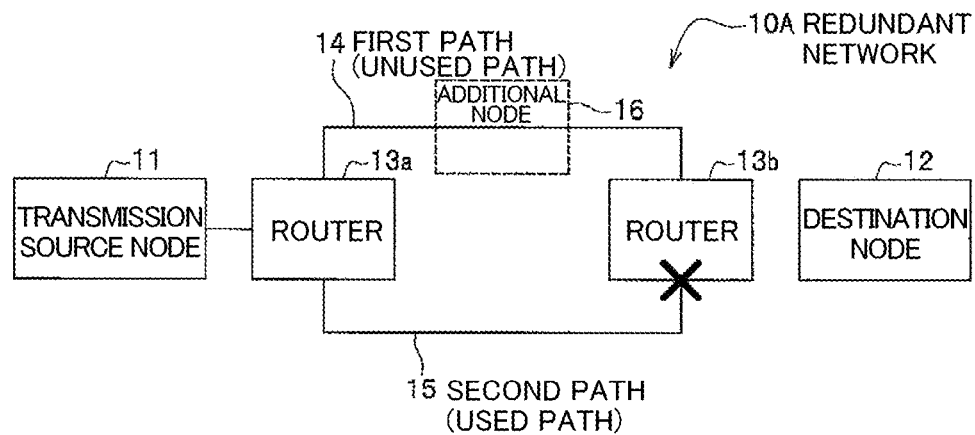
FIG. 12 is a diagram showing a configuration in the case where the first path in the redundant network in the conventional optical transmission system is an unused path, and the second path is a used path, and in the case where a connector of the used path is pulled out.

However, although FIG. 1 shows only one optical fiber 22 between the optical transceivers 21a and 21b, it is assumed that a redundant network configuration is employed here, as shown in FIG. 10 mentioned above. The redundant network is preferably a PtoP (Peer to Peer) network that includes one-to-one network connection between nodes.

One optical transceiver 21a and the communication terminal device 24a are connected to each other by an Ethernet (registered trademark) cable 26, and exchange Ethernet frame signals 26a. The other optical transceiver 21b and the communication terminal device 24b are also connected to each other similarly by an Ethernet cable 26.

Each of the optical transceivers 21a and 21b includes a control unit 31, a modulation unit 32, an optical signal transmission unit 33, and an optical signal receiving unit 34.

The control unit 31 performs control to separately superimpose an actual data signal (actual data), an OAM signal O1 (see FIG. 5(a)), and an idle signal A1 on an optical signal transmitted through the optical fiber 22. The signals superimposed on the optical signal are transmitted from the optical signal transmission unit 33 to the optical fiber 22.

The aforementioned actual data signal is a signal that includes the Ethernet frame signals 26a received from the communication terminal devices 24a and 24b, and is transmitted to the aforementioned used path (see FIG. 10) of the optical fiber 22.

The idle signal A1 is a signal with empty data that does not contain actual data, and is transmitted through an unused path (see FIG. 10), through which the aforementioned actual data signal is not transmitted, of the optical fiber 22. This idle signal A1 can be detected by the idle detector 23 from outside the optical fiber 22, and it is detected, at the time of this detection, that the optical fiber cable 22 is the unused path. This is because, since the idle signal A1 is not transmitted through the used path through which the actual data signal is transmitted, and the idle signal A1 is only transmitted through the unused path, it can be detected that the optical fiber 22 is the unused path if the idle signal A1 is detected therefrom.

The modulating unit 32 outputs a control signal C1 (FIG. 2(b)) to the optical signal transmission unit 33. The control signal C1 is a signal for performing ON/OFF modulation on the optical signal P1 (FIG. 2(c)) on which the idle signal A1 is superimposed, when this idle signal A1 (FIG. 2(a)) is transmitted in accordance with the control of the control unit 31. The control signal C1 repeats, every fixed period, an operation to turn ON and OFF within the fixed period (e.g. 3.7 ms) at low speed shown in FIG. 2(b). This period at which the control signal C1 turns ON and OFF is referred to as a modulation period T1.

Due to the ON/OFF modulation, as shown in FIG. 2(c), the optical signal P1 transmitted through the optical fiber 22 is bursted to repeatedly switch between the "H" level and the "L" level (which are also referred to as "H" and "L"). Note that each of the "H" and "L" portions of the optical signal P1 constitutes a modulated portion of the optical signal described in the claims.

Figure 3:
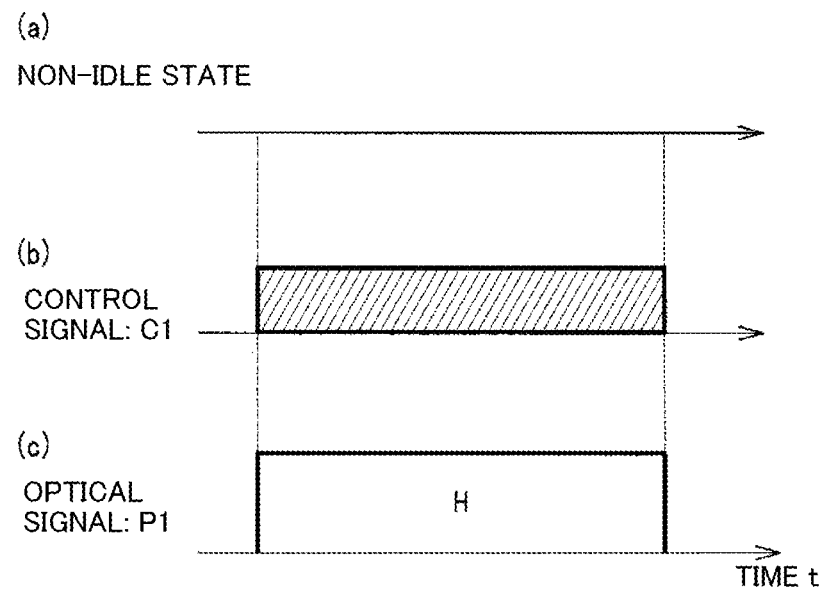
FIG. 3 is a timing chart showing timings of (a) a non-idle state, (b) the control signal, and (c) the optical signal in the optical transmission system of the present embodiment.

However, in a non-idle state where the idle signal A1 does not flow as shown in FIG. 3(a), the control signal C1 does not change as shown in FIG. 3(b), and the optical signal P1 also remains at the "H" level and does not change as shown in FIG. 3(c).

Figure 4:
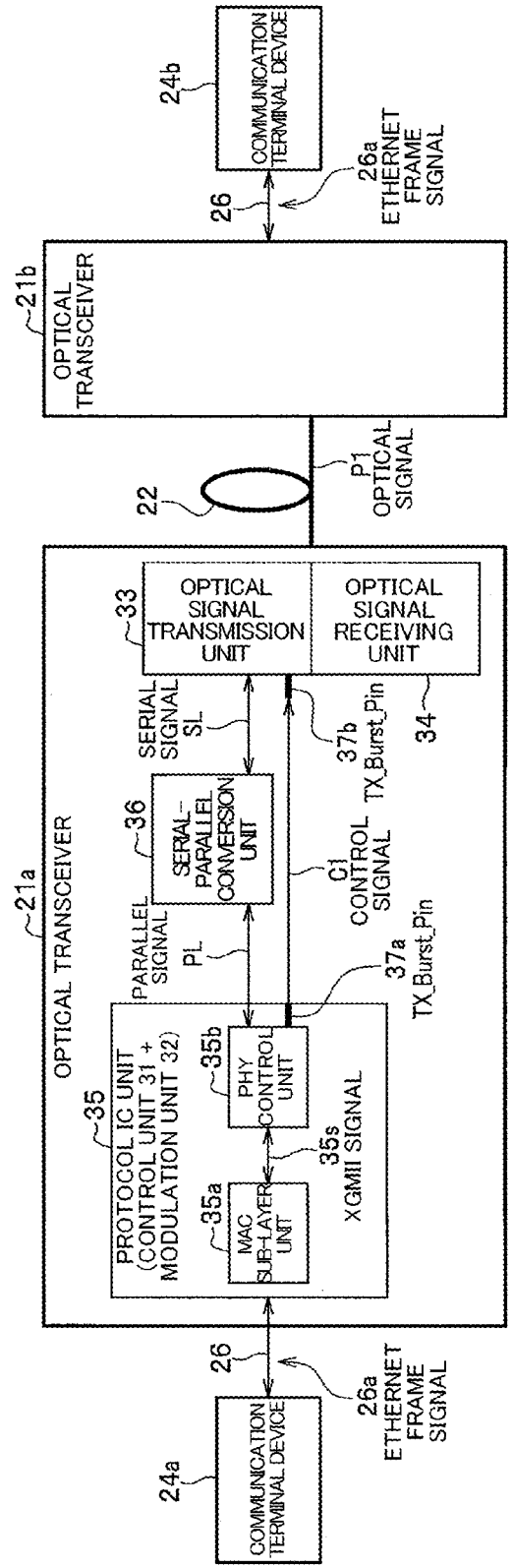
FIG. 4 is a diagram showing a specific example of a configuration of an optical transceiver in the optical transmission system in the present embodiment.

Furthermore, a specific example of the optical transceivers 21a and 21b will be described, with the optical transceiver 21a representatively shown in FIG. 4. The optical transceiver 21a shown in FIG. 4 is configured based on an SFP (Small Form-Factor Pluggable) transceiver that performs a well-known burst operation, and includes a protocol IC (Integrated Circuit) unit 35 that has the functions of the above-described control unit 31 and modulation unit 32, a serial-parallel conversion unit (which is also referred to as a conversion unit) 36, and the aforementioned optical signal transmission unit (which is also referred to as a transmission unit) 33 and optical signal receiving unit (which is also referred to as a receiving unit) 34. Note that the protocol IC unit 35 constitutes a control modulation unit described in the claims.

The protocol IC unit 35 includes a MAC (Media Access Control) sub-layer unit 35a, which is constituted by an FPGA (Field Programmable Gate Array), and a PHY (physical layer) control unit 35b.

The PHY (physical layer) of the PHY control unit 35b is a type of protocol that pertains to the most physical position in the OSI (Open System Interconnection) reference model in the network. In the PHY, the physical content such as the shape of the interface and the data transmission method is defined. For example, the shape of a connector, the mode of voltage and wavelength used to convert electrical signals, and so on, are defined. The PHY is also provided with a function of transmitting and receiving electrical signals and scrambling data.

The PHY control unit 35b includes a Tx_Burst_Pin (transmission burst pin) 37a, and is connected to a Tx_Burst_Pin 37b provided in the transmission unit 33. This PHY control unit 35b outputs the aforementioned control signal C1 to the transmission unit 33 via the Tx_Burst_Pins (also referred to as pins) 37a and 37b in accordance with the control of a later-described MAC sub-layer unit 35a.

The MAC sub-layer unit 35a is constituted by an FPGA (Field Programmable Gate Array) that allows a user to change the connection configuration of the logic circuit and can be freely programmed. The MAC sub-layer unit 35a controls transmission and reception between the communication terminal devices 24a and 24b, which support Ethernet, using a MAC address with a transmission source and a destination.

The MAC sub-layer unit 35a performs processing to exchange data with the PHY control unit 35b, and performs processing to absorb a difference in communication media at the physical layer and the subsequent layers. Due to this processing, various communication media can be realized only by changing software (logic circuit of the FPGA) at the MAC sub-layer, which is the MAC sub-layer 35a, and the subsequent layers.

The MAC sub-layer 35a is connected to the PHY control unit 35b by an interface such as XGMII (10 Gigabit Media Independent Interface), which is defined by IEEE802.3z, and can be connected to the optical fiber 22, which is a network, via the PHY control unit 35b, the modulation unit 32, the transmission unit 33, and the receiving unit 34.

Each of the aforementioned actual data signal, idle signal A1, and OAM signal O1 is separately superimposed on an XGMII signal 35s, which is exchanged between the MAC sub-layer unit 35a and the PHY control unit 35b. Each of the superimposed signals is converted between a serial signal SL and a parallel signal PL by a serial-parallel conversion unit 36 that is connected between the optical signal transmission unit 33 and the PHY control unit 35b.

Although the serial signal SL between the conversion unit 36 and the transmission unit 33 is indicated by a double arrow in FIG. 4, this double arrow also expresses that the serial signal SL deriving from the optical signal P1 received by the receiving unit 34 is output to the conversion unit 36.

The MAC sub-layer portion 35a controls the PHY control unit 35b such that the control signal C1 (see FIG. 2(b)) is output from the pin 37a of the PHY control unit 35b. The control signal C1 is a signal that turns ON and OFF within a fixed period (e.g. 3.7 ms) at low speed when the idle signal A1 superimposed on the XGMII signal 35s is transmitted, and repeats this operation. Due to this control, the control signal C1 output from the pin 37a is output to the pin 37b of the transmission unit 33. Upon the control signal C1 being input to the pin 37b, the transmission unit 33 transmits, to the optical fiber 22, the optical signal P1 (see FIG. 2(c)) that repeatedly switches between "H" and "L" at the fixed period.

Furthermore, the MAC sub-layer unit 35a controls the PHY control unit 35b such that, when the OAM signal O1, which turns ON in a pulsed manner at a fixed period, is transmitted while being superimposed on the XGMII signal 35s, the control signal C1 that turns ON in a pulsed manner at the same fixed period is output from the pin 37a of the PHY control unit 35b. Due to this control, the control signal C1 output from the pin 37a is output to the pin 37b of the transmission unit 33. Thus, the transmission unit 33 transmits, to the optical fiber 22, the optical signal P1 that switches to "H" in a pulsed manner at the same fixed period.

However, the OAM signal O1 is commonly transmitted at a period (which will be referred to as an OAM period T2) of any of 3.3 ms, 10 ms, 100 ms, 10 s, 1 m, and 10 m. Note that the OAM period T2 may also be a period other than the above-listed periods. The modulation period T1 of the control signal C1 is made different from the OAM period T2 such that the modulation period T1 does not overlap the OAM period T2.

Also, if the optical fiber 22 is a concentration network, inconvenience may occur; e.g. the idle signal A1 overlaps the actual data signal or collides with other traffic signals. Then, the idle signal A1 may not be able to be detected. In the present embodiment, however, the optical fiber 22 is a PtoP network that includes one-to-one network connection between nodes, and thus there is no concern that the aforementioned inconvenience will occur.

The idle detector 23 shown in FIG. 1 is configured based on the aforementioned optical fiber identifier, and includes a bending unit 23a, a detection unit 23b, and a display unit 23c.

The bending unit 23a bends the optical fiber cable 22 inserted into a groove in the bending unit 23a, and cause leakage light to be generated. The amount of bending is designed in a range that does not give the optical signal P1 with adverse influence such as signal loss.

The detection unit 23b detects "H" and "L" of the optical signal P1 in accordance with detection of the aforementioned leakage light, and detects the idle signal A1 when detecting these "H" and "L" states. The detection unit 23b detects that the optical fiber 22 is the unused path by detecting the idle signal A1. Note that the detection unit 23b may detect the idle signal A1 when detecting the ON/OFF state, which is the modulated portion of the optical signal P1, a predetermined number of times.

The display unit 23c displays that the idle signal A1 has been detected, and displays that the optical fiber 22 is the unused path when the idle signal A1 is detected.

Next, a description will be given, with reference to FIGS. 5 to 9, of settings of the modulation period T1 of the control signal C1 and the OAM period T2 of the OAM signal O1 when the idle signal A1 is transmitted. However, the modulation period T1 may be set in any manner.

Figure 5:
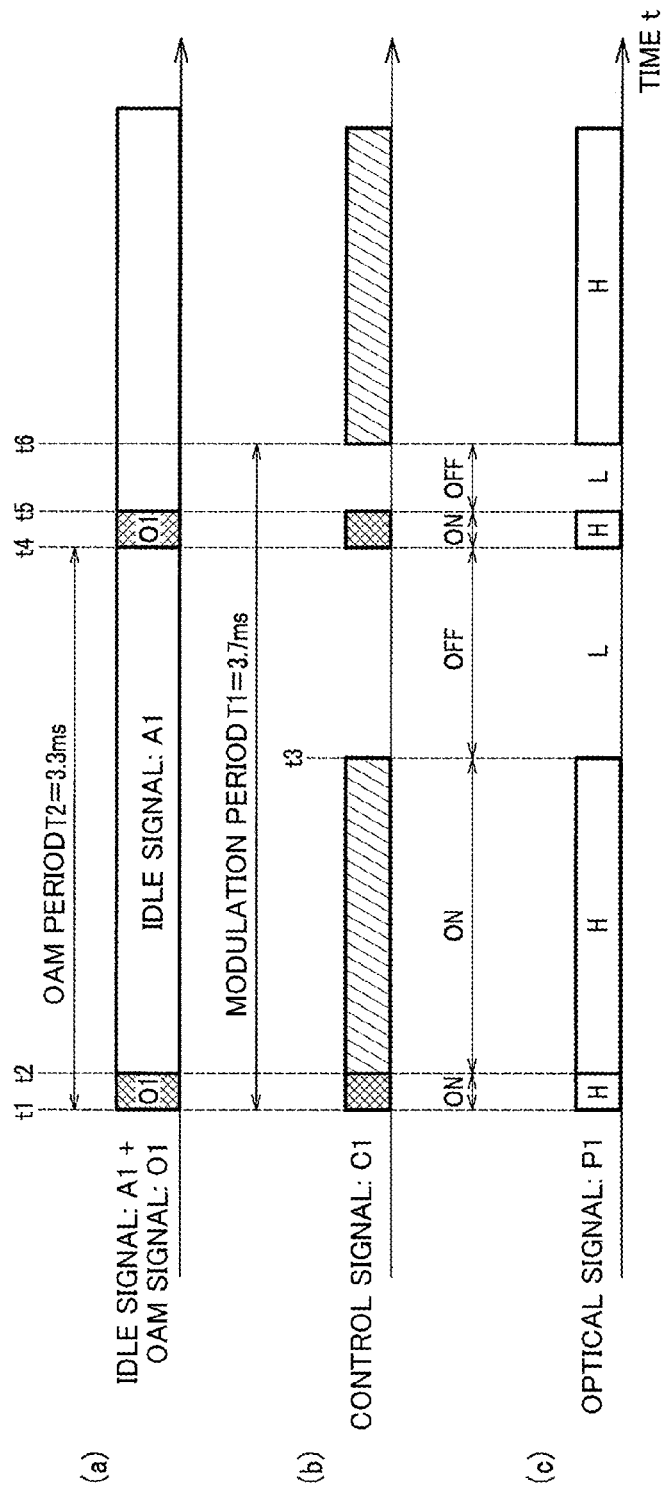
FIG. 5 is a timing chart showing timings of (a) the idle signal and an OAM signal, (b) the control signal, and (c) the optical signal when a modulation period T1 of the control signal is made longer than an OAM period T2 of the OAM signal in the optical transmission system of the present embodiment.

FIG. 5 is a timing chart of the idle signal A1, the OAM signal O1, the control signal C1, and the optical signal P1 when the modulation period T1 is made longer than the OAM period T2.

The modulation period T1 is 3.7 ms, and the CAM period T2 is 3.3 ms.

As denoted with a sign O1 from the time t1 to t2 and from the time t4 to t5 in FIG. 5(a), the MAC sub-layer unit 35a superimposes, on the XGMII signal 35s, the OAM signal O1 that turns on in a pulsed manner at the OAM period T2=3.3 ms, and outputs this XGMII signal 35s to the PHY control unit 35b. The PHY control unit 35b turns ON the control signal C1 in synchronization with the output of the OAM signal O1, and outputs the control signal C1 from the pin 37a to the pin 37b of the transmission unit 33.

Also, the MAC sub-layer unit 35a controls the PHY control unit 35b such that, when the idle signal A1 is transmitted, the control signal C1 turns ON/OFF at one modulation period T1=3.7 ms shown from the time t2 to t6 in FIG. 5(b). Originally, the thus-controlled control signal C1 turns ON from the time t2 to t3 and turns OFF from the time t3 to t6 within the modulation period T1.

However, the OAM signal O1 with the OAM period T2=3.3 ms, which is shorter than the modulation period T1=3.7 ms, turns ON in a pulsed manner as shown from the time t4 to t5 in the OFF section of the control signal C1 from the time t3 to t6.

If this control signal C1 is input to the pin 37b of the transmission unit 33, the optical signal P1 transmitted from the transmission unit 33 to the optical fiber 22 switches to "H" and "L" in synchronization with the control signal C1, as shown in FIG. 5(c). That is to say, the optical signal P1 is at "H" from the time t1 to t3, at "L" from the time t3 to t4, at "H" from the time t4 to t5 in a pulsed manner, and at "L" from the time t5 to t6.

For this reason, if the optical signal P1 at and after the time t1 is detected by the idle detector 23, the idle detector 23 detects "H" deriving from the OAM signal O1 from the time t4 to t5 while detecting "H" and then "L" from the time t2 to t6 shown in FIG. 5(c). When "H" of the OAM signal O1 is detected, the idle signal A1 is erroneously detected based on the pattern of "H" and "L" detected before the detection of "H" of the OAM signal O1.

Thus, if the modulation period T1 (3.7 ms) is made longer than the OAM period T2 (3.3 ms), the idle signal A1 and the OAM signal O1 cannot be distinguished from each other by detecting "H" and "L" of the optical signal P1. That is to say, since the idle signal A1 cannot be appropriately detected, whether the optical fiber 22 is the unused path or the used path cannot be appropriately detected.

In the present embodiment, "H" and "L" of the optical signal P1 that is modulated based on ON/OFF of the control signal C1 can be appropriately detected by setting a plurality of modulation periods T1 within one CAM period T2. This setting is shown in FIG. 6.

Figure 6:
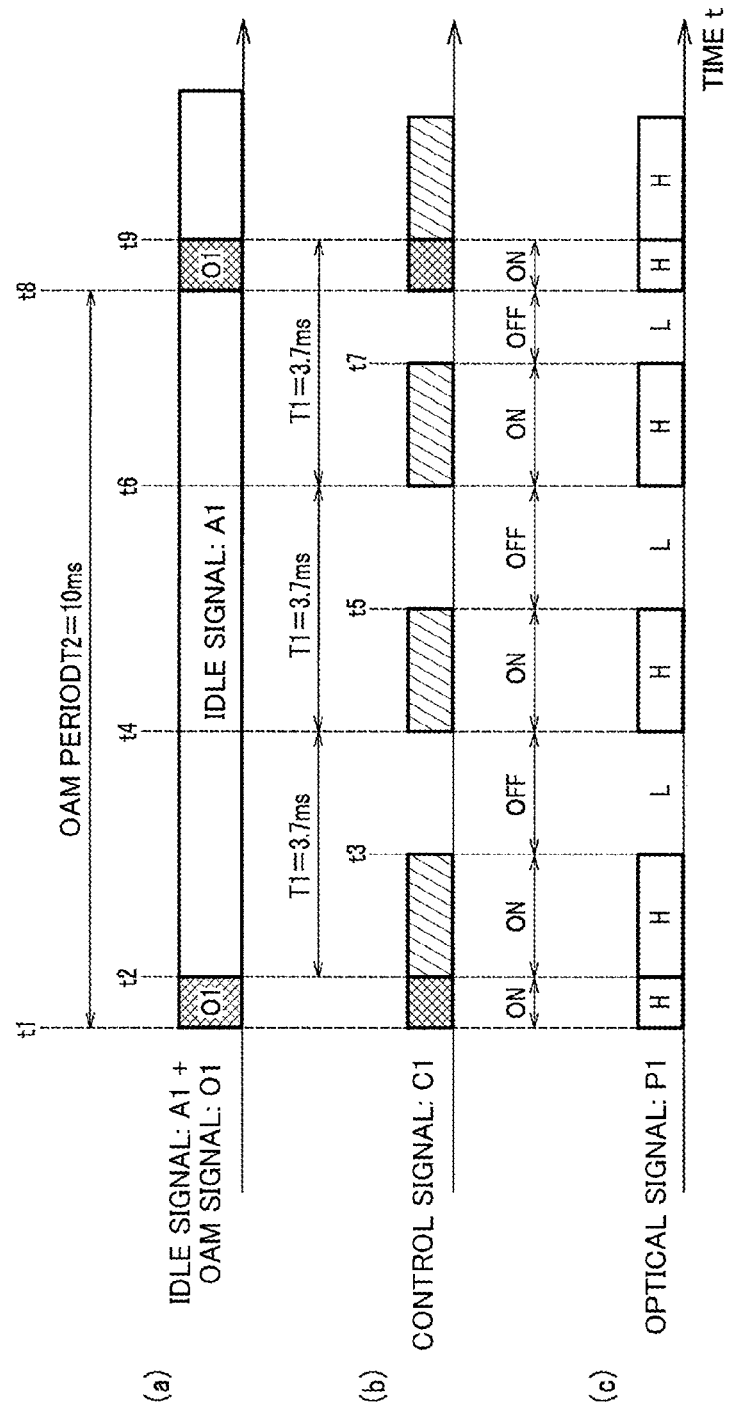
FIG. 6 is a timing chart showing timings of (a) the idle signal and the OAM signal, (b) the control signal, and the (c) optical signal when the OAM period T2 of the OAM signal is set as a period that exceeds two modulation periods T1 of the control signal in the optical transmission system of the present embodiment.

FIG. 6 shows a mode in which more than two modulation periods T1, one modulation period T1 being 3.7 ms, are set from the time t2 to t9, in the OAM period T2 from the time t1 to t8, one OAM period T2 being 10 ms. Note that each of the periods from the time t2 to t4, from the time t4 to t6, and from the time t6 to t9 corresponds to one modulation period T1.

As denoted with the sign O1 from the time t1 to t2 and from the time t8 to t9 in FIG. 6(a), the MAC sub-layer unit 35a superimposes, on the XGMII signal 35s, the OAM signal O1 that turns ON in a pulsed manner at the OAM period T2=10 ms, and outputs this XGMII signal 35s to the PHY control unit 35b.

Also, the MAC sub-layer unit 35a controls the PHY control unit 35b such that, when the idle signal A1 is transmitted, the control signal C1 turns ON and OFF at the modulation period T1=3.7 ms as shown from the time t2 to t4, from the time t4 to t6, and from the time t6 to t9 shown in FIG. 6(b). In response to this control, the PHY control unit 35b performs a control operation such that the control signal C1 output from the pin 37a turns ON and OFF at the modulation period T1 from the time t2 to t9. At this time, the control signal C1 turns ON from the time t8 to t9 due to the pulsed QAM signal O1.

If the control signal C1 is input to the pin 37b of the transmission unit 33, the optical signal P1 transmitted from the transmission unit 33 to the optical fiber 22 switches to "H" and "L" in synchronization with the control signal C1 turning ON and OFF, as shown in FIG. 6(c). In this case, the optical signal P1 of which "H and "L" can be appropriately detected is transmitted, at least as in the modulation period T1 shown from the time t4 to t6, within one OAM period T2.

Figure 7:
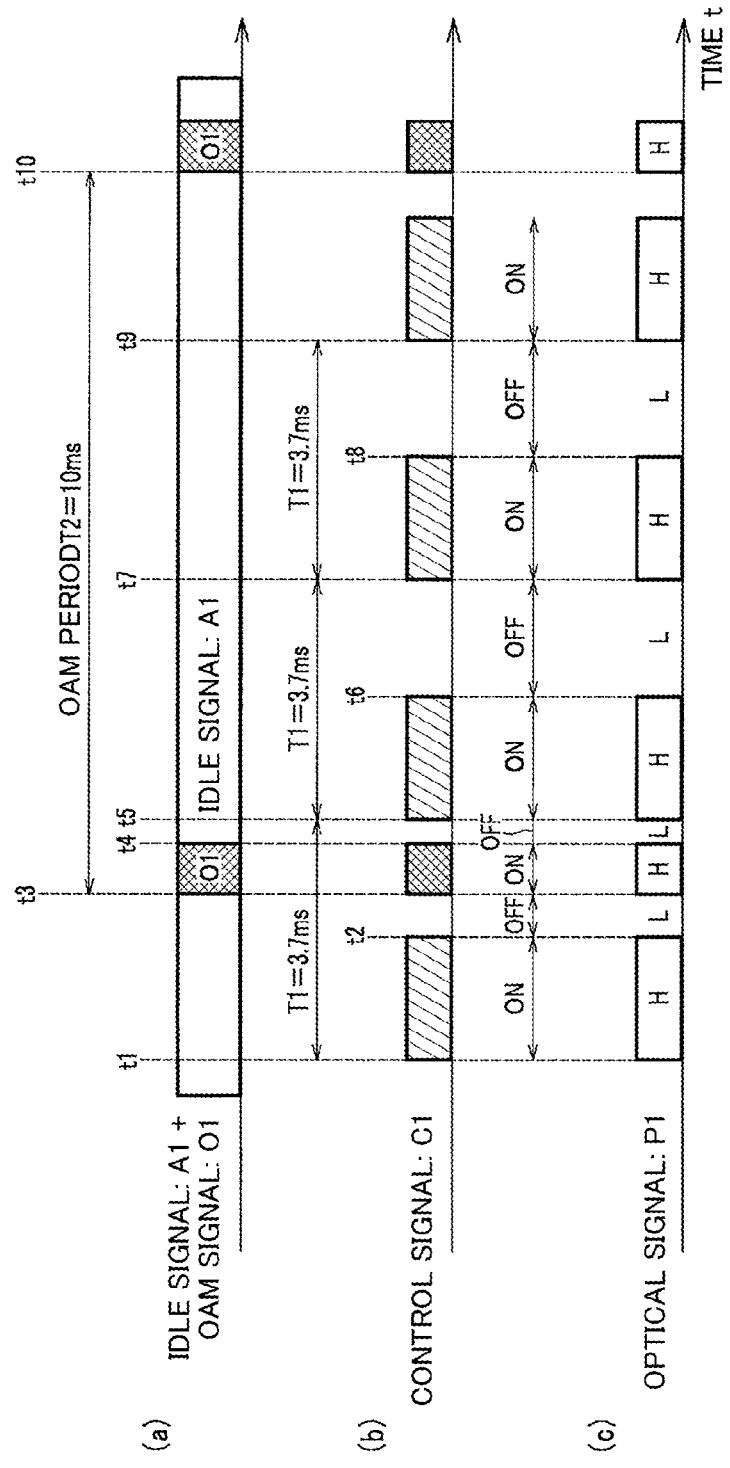
FIG. 7 is a timing chart showing timings different from those in FIG. 6 of (a) the idle signal and the OAM signal, (b) the control signal, and (c) the optical signal when the OAM period T2 of the OAM signal is set as a period that exceeds two modulation periods T1 of the control signal in the optical transmission system of the present embodiment.

The same applies to the case of employing other timings shown in FIG. 7. That is to say, in FIG. 7(a), the OAM signal O1 with an OAM period T2 from the time t3 to t10 is transmitted when the idle signal A1 is transmitted. In this case, the optical signal P1 of which "H and "L" can be appropriately detected is transmitted, as in the modulation period T1 that is shown from the time t5 to t7 and from the time t7 to t9, within one CAM period T2.

Here, it is assumed that the idle detector 23 is set onto the optical fiber 22 through which the idle signal A1 and the OAM signal O1 are transmitted as mentioned above, and detects the optical signal P1. In this case, "H" and "L" of the optical signal P1 can be appropriately detected from the time t4 to t6 in FIG. 6(c), as well as from the time t5 to t7 and from the time t7 to t9 in FIG. 7(c).

Accordingly, the idle signal A1 can be appropriately detected.

In other words, if one OAM period T2 is a period that exceeds two modulation periods T1, it is possible to appropriately detect "H" and "L" of the optical signal P1 subjected to the ON/OFF modulation of the control signal C1 performed when the idle signal A1 is transmitted, within the OAM period T2. Accordingly, the idle signal A1 can be appropriately detected.

The above-described control by which one OAM period T2 of the OAM signal O1 is set as a period that exceeds two modulation periods T1 of the control signal C1 can be realized by changing the logic circuit of the FPGA that constitutes the MAC sub-layer unit 35a.

In addition, there are cases where, even if one OAM period T2 is set as a period that is equal to two or more modulation periods T1, "H" and "L" of the optical signal P1 can be appropriately detected as follows within the OAM period T2, depending on later-described conditions.

It is assumed that the modulation period T1 is set as 5 ms, and the OAM period T2 is set as twice the modulation period T1 (two modulation periods T1), namely 10 ms, as shown in FIGS. 8(a) to 8(c). In this case, under a condition that the pulsed OAM signal O1 (e.g. the time t3 to t4) is separate from the ON section (e.g. from the time t5 to t6) of the control signal C1, "H" and "L" of the optical signal P1 shown in the modulation period T1 from the time t5 to t7 can be appropriately detected.

Figure 8:
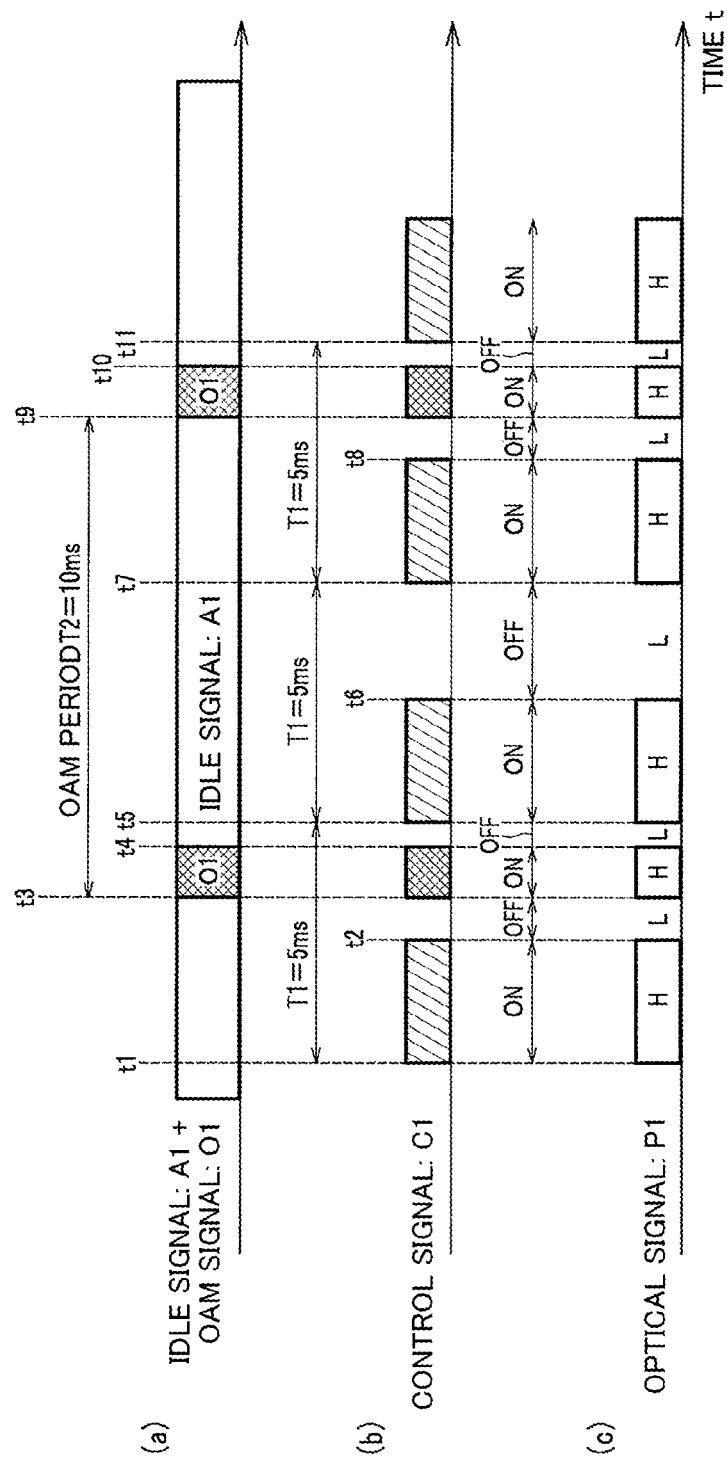
FIG. 8 is a timing chart showing timings of (a) the idle signal and the OAM signal, (b) the control signal, and (c) the optical signal when the OAM period T2 of the OAM signal is set as a period equal to two modulation periods T1 of the control signal, and the OAM signal is separate from an ON section of the control signal in the optical transmission system of the present embodiment.
Figure 9:
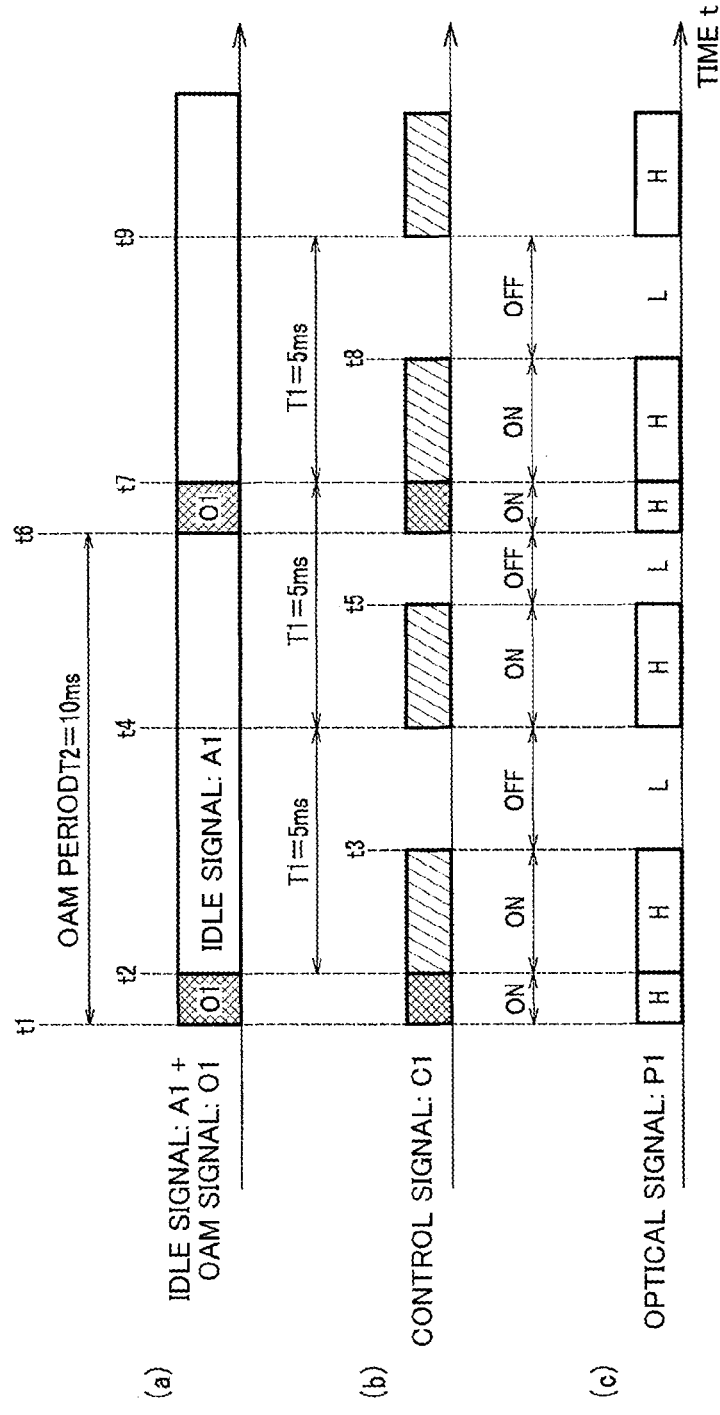
FIG. 9 is a timing chart showing timings of (a) the idle signal and the OAM signal, (b) the control signal, and (c) the optical signal when the OAM period T2 of the OAM signal is set as a period equal to two modulation periods T1 of the control signal, and the OAM signal is continuous with an ON section of the control signal in the optical transmission system of the present embodiment.

However, it is assumed that, in the case of the set periods shown in FIGS. 9(a) to 9(c) that are the same as those in FIG. 8, the pulsed OAM signal O1 (e.g. the time t1 to t2) is continuous with the ON section (e.g. from the time t2 to t3) of the control signal C1. In the case of this condition, the optical signal P1 switches to "H" in synchronization with this continuous portion, and therefore the distinction between the idle signal A1 and the OAM signal O1 cannot be made. That is to say, the idle signal A1 cannot be appropriately detected.

Accordingly, if the OAM period T2 is set as being equal to two modulation periods T1 as shown in FIG. 8, and the OAM signal O1 is separated from the ON section of the control signal C1, "H" and "L" of the optical signal P1 that is modulated based on ON/OFF of the control signal C1 can be appropriately detected, and thus the idle signal A1 can be appropriately detected.

The above-described control by which one OAM period T2 of the OAM signal O1 is set as being equal to two modulation periods T1 of the control signal C1 can be realized by changing the logic circuit of the FPGA that constitutes the MAC sub-layer unit 35a.

Effects of Embodiment

Effects of the optical transmission system 20 according to the present embodiment will be described. An optical transmission system 20 has a configuration in which an unused path through which actual data is not transmitted from the communication terminal devices 24a and 24b connected to the optical transceivers 21a and 21b, each of which has the transmission unit 33 for transmitting the optical signal P1 and the receiving unit 34 for receiving the optical signal P1, can be detected from a plurality of optical fiber 22 through which the pulsed OAM signal O1 for maintenance and monitoring is transmitted while being superimposed on the optical signal P1, the optical fiber 22 connecting the optical transceivers 21a and 21b. This optical transmission system 20 has the following characteristic configuration.

(1) Each of the optical transceivers 21a and 21b includes the protocol IC unit 35 serving as a control modulation unit.

This protocol IC unit 35 outputs the control signal C1 to the transmission unit 33 for transmitting the optical signal P1. The control signal C1 is a signal for performing, within a fixed modulation period T1, ON/OFF modulation on the optical signal P1, on which the idle signal A1 with empty data is superimposed, the idle signal A1 being transmitted through the unused path while being superimposed on the optical signal P1. Also, the protocol IC unit 35 includes the protocol IC unit 35 that performs control to turn ON the control signal C1 when the OAM signal O1 with the OAM period T2, which is a period different form the modulation period T1, is output. Furthermore, the protocol IC unit 35 performs control to set the OAM period T2 as a period longer than or equal to a plurality of modulation periods T1. The transmission unit 33 is configured to perform ON/OFF modulation on the optical signal P1, using the control signal C1.

According to this configuration, if the OAM period T2 is set as a period that exceeds, for example, two modulation periods T1 by the protocol IC unit 35, an optical signal P1 corresponding to one modulation period T1 that has been subjected to the ON/OFF modulation based on the control signal C1 when the idle signal A1 is transmitted can be reliably caused to be present during one period of the OAM signal O1 that rises in a pulsed manner, for example, at the QAM period T2. "H" and "L", which are modulated portions of this optical signal P1 for one modulation period T1 can be detected by the idle detector 23 from outside the optical fiber 22, and the idle signal A1 can be appropriately detected. Therefore, according to this configuration, the unused path can be appropriately detected.

In the case of using the optical transceivers 21a and 21b equipped with an FPGA that allows the connection configuration of the logic circuit to be changed and can be freely programmed, the protocol IC unit 35 that enables the above-described detection can be realized only by configuring the protocol IC unit 35 that performs the above control using this FPGA. This configuration does not need additional circuits, additional devices, or the like. In addition, since no change is made to already-installed optical fibers, reinstallation or rewiring is not needed. Accordingly, the configuration for detecting the idle signal A1 of the present invention can be realized at low cost.

Furthermore, optical signals with two different wavelengths are not transmitted to detect an unused path as in the conventional technique, and only the optical signal P1 with one wavelength is needed in the present invention. For this reason, a relay amplifier can be used, and the unused path can be detected even in the case of a long-distance optical fiber 22. Accordingly, a function of detecting the unused path through which actual data is not transmitted in a long-distance redundant optical fiber 22 (redundant network) can be realized at low cost.

(2) The protocol IC unit 35 is configured to perform control to set the OAM period T2 as a period that exceeds two modulation periods T1.

According to this configuration, the optical signal P1 corresponding to one modulation period T1 that has been subjected to the ON/OFF modulation based on the control signal C1 when the idle signal A1 is transmitted can be reliably caused to be present within the OAM period T2. Thus, the idle signal A1 can be appropriately detected, and therefore the unused path can be appropriately detected.

(3) The protocol IC unit 35 is configured to perform control to set the OAM period T2 as being equal to two modulation periods T1, and separate the timing of the OAM signal O1 with this OAM period T2 from the timing of the ON section of the control signal C1.

According to this configuration, even if the OAM period T2 is a short period equal to two modulation periods T1, the optical signal P1 corresponding to one modulation period T1 that has been subjected to the ON/OFF modulation based on the control signal C1 when the idle signal A1 is transmitted can be reliably caused to be present within the OAM period T2. Thus, the idle signal A1 can be appropriately detected, and therefore the unused path can be appropriately detected.

(4) The protocol IC unit 35 has a circuit configuration with an FPGA that is installed in advance in each of the optical transceivers 21a and 21b, allow the connection configuration of the logic circuit to be changed, and can be programmed.

According to this configuration, the control performed by the protocol IC unit 35 can be carried out by changing the connection configuration of the logic circuit of the FPGA, and no additional circuit, additional device, or the like is required to carry out the control. Thus, the protocol IC unit 35 can be realized at low cost.

(5) A configuration is employed that includes the idle detector 23 that detects the idle signal A1 when detecting, a predetermined number of times, the ON/OFF portion, which is the modulated portion of the fixed modulation period T1 of the optical signal P1 based on the control signal C1 that is output when the idle signal A1 is transmitted, and that detects that the optical fiber cable 22 is the unused path based on the detection of the idle signal A1.

According to this configuration, the idle signal A1 can be appropriately detected, and it is therefore possible to appropriately detect the unused path.

Also, specific configurations can be modified as appropriate, without departing from the gist of the present invention.

REFERENCE SIGNS LIST

20 Optical transmission system
21a, 21b Optical transceiver
22 Optical fiber cable
23 Idle detector
23a Bending unit
23b Detection unit
23c Display unit
24a, 24b Communication terminal device
31 Control unit
32 Modulation unit
33 Optical signal transmission unit
34 Optical signal receiving unit
35 Protocol IC unit
35a MAC sub-layer unit
35b PHY control unit
35s XGMII signal
36 Serial-parallel conversion unit
37a, 37b Tx_Burst_Pin
32a TD_snoop_Pin
32b AUX_mod_Pin (out)
32s Determination result signal
33 Optical signal transmission unit
33a AUX_mod_Pin (in)
34 optical signal receiving unit
35 Optical intensity control unit
36 Serial-parallel conversion unit
37 Laser
P1 Optical signal
C1 Control signal
A1 Idle signal
O1 OAM signal
D1 Actual data signal

The invention claimed is:

1. An optical transmission system comprising an unused path through which actual data is not transmitted from communication terminal devices connected to optical transceivers, each of which has a transmission unit, including one or more processors, configured to, transmit an optical signal and a receiving unit, including one or more processors, configured to, receive the optical signal, detected from a plurality of optical transmission paths through which a pulsed OAM signal for maintenance and monitoring is transmitted while being superimposed on the optical signal, the optical transmission paths connecting the optical transceivers, each of the optical transceivers comprising:

a control modulation unit, including one or more processors, configured to, output, to the transmission unit for transmitting the optical signal, a control signal for modulating, at a fixed modulation period, the optical signal on which an idle signal with empty data is superimposed, the idle signal being transmitted through the unused path while being superimposed on the optical signal, and to turn ON the control signal when the OAM signal with an OAM period, which is a period different from the modulation period, is output, wherein the control modulation unit performs control to set the OAM period as a period longer than or equal to a plurality of modulation periods, and the transmission unit modulates the optical signal using the control signal.

2. The optical transmission system according to claim 1, wherein the control modulation unit is configured to set the OAM period as a period that exceeds two modulation periods.

3. The optical transmission system according to claim 1, wherein the control modulation unit is configured to set the OAM period as a period equal to two modulation periods, and to separate a timing of the OAM signal with the OAM period from a timing of an ON section of the control signal.

4. The optical transmission system according to claim 1, wherein the control modulation unit includes an FPGA (Field Programmable Gate Array) installed in advance in each of the optical transceivers, to allow a connection configuration of a logic circuit to be changed, and programmed.

5. The optical transmission system according to claim 1, further comprising a detector configured to detect the idle signal a predetermined number of times, a modulated portion of a fixed modulation period of the optical signal based on the control signal output when the idle signal is transmitted, and detecting, based on the detection of the idle signal, that an optical transmission path is the unused path.

6. An optical transmission method for checking an unused path in an optical transmission system comprising an unused path through which actual data is not transmitted from communication terminal devices connected to optical transceivers, each of which has a transmission unit configured for transmitting an optical signal and a receiving unit configured for receiving the optical signal, can be detected from a plurality of optical transmission paths through which a pulsed OAM signal for maintenance and monitoring is transmitted while being superimposed on the optical signal, the optical transmission paths connecting the optical transceivers, the optical transmission method executed by each of the optical transceivers comprising:

outputting, to the transmission unit for transmitting the optical signal, a control signal for modulating, at a fixed modulation period, the optical signal on which an idle signal with empty data is superimposed, the idle signal being transmitted through the unused path while being superimposed on the optical signal;

performing control to turn ON the control signal when the OAM signal with an OAM period, which is a period different from the modulation period, is output; and performing control to set the OAM period as a period longer than or equal to a plurality of modulation periods, and modulating, by the transmission unit the optical signal using the control signal.

7. The optical transmission method according to claim 6, further comprising, setting the OAM period as a period that exceeds two modulation periods.

8. The optical transmission method according to claim 6, further comprising, setting the OAM period as a period equal to two modulation periods, and separating a timing of the OAM signal with the OAM period from a timing of an ON section of the control signal.

9. The optical transmission method according to claim 6, further comprising, allowing, by the control modulation unit including an FPGA (Field Programmable Gate Array) installed in advance in each of the optical transceivers, a connection configuration of a logic circuit to be changed, and programmed.

10. The optical transmission system according to claim 6, further comprising, detecting, by a detector configured to detect the idle signal a predetermined number of times, a modulated portion of a fixed modulation period of the optical signal based on the control signal output when the idle signal is transmitted, and detecting, based on the detection of the idle signal, that an optical transmission path is the unused path.

\* \* \* \* \*